United States Patent Office 3,367,929
Patented Feb. 6, 1968

3,367,929
AZO DYE FROM COUPLING DIAZOTIZED SODIUM S-4-AMINOPHENYLTHIOSULFATE AND ACETO-ACET-2′,5′-DIMETHOXYANILIDE
Isom E. Wagoner, Jr., Gastonia, N.C., assignor to Martin-Marietta Corporation, a corporation of Maryland
No Drawing. Filed June 11, 1965, Ser. No. 463,348
1 Claim. (Cl. 260—193)

ABSTRACT OF THE DISCLOSURE

An azo dye of the formula

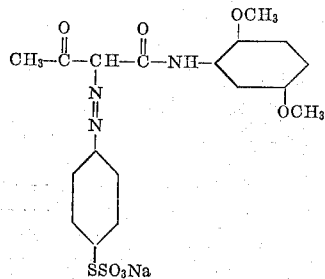

and method for making same by coupling equimolar amounts of diazotized sodium S-4-aminophenylthiosulfate and acetoacet-2′-5′-dimethoxyanilide. This yellow dye may be solubilized to its mercaptide form with aqueous sodium sulfide, and that the dye may be applied to cotton fabric by reduction-oxidation, either singly or in combination with pre-reduced liquid sulfur dyes.

---

The present invention relates to an azo dye and to the method for making same.

The dye of the present invention is particularly characterized in having the structural formula

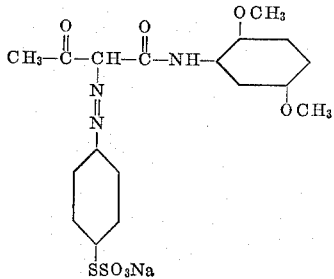

The method of the present invention is particularly characterized in that the dye of the above structural formula may be prepared by coupling equimolar amounts of diazotized sodium S-4-aminophenylthiosulfate and acetoacet-2′,5′-dimethoxyanilide.

There is unknown in the prior art a dye formed by coupling equimolar amounts of a diazotized aminophenyl-monothiosulfate with an arylide of acetoacetic acid and which dye has the property of forming the soluble mercaptide form of the dye upon addition of aqueous sodium sulfide. For example, the dye formed by coupling equimolar amounts of diazotized sodium S-4-aminophenylthiosulfate and acetoacet-ortho-anisidide forms into an unworkable gelatinous mass when one attempts to reduce it to the soluble mercaptide form by adding aqueous sodium sulfide.

Surprisingly, it has been found that the dye of the present invention is readily reducible to its soluble mercaptide form with aqueous sodium sulfide. Thus, the dye of the present invention may be applied to textile fibers, such as cotton or regenerated cellulose, by the reduction-oxidation method. Also, it may be dyed in combination with pre-reduced liquid sulfur dyes to obtain desirable shades and hues. For example, sulfur yellow dyes are rather dull and leave something to be desired in their light fastness properties. The dye of the present invention is a particularly bright greenish-yellow dye, having commercially acceptable wash fastness and better than average light fastness for an azo dye having a pendant thiosulfate group on the molecule, and therefore addition of the dye of the present invention to dye baths containing pre-reduced liquid sulfur yellow dyes brightens the shade and improves the light fastness of the resulting dyeing.

Another advantage of the dye of the present invention is that it is relatively inexpensive to produce.

In the following illustrative examples, all parts are by weight unless otherwise specified.

Example 1

The azo dye of the formula

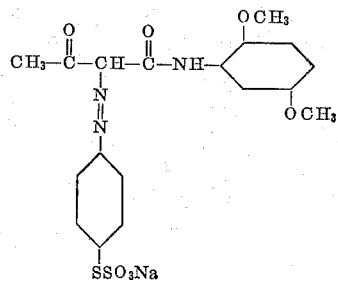

may be prepared as follows.

One g.m.w. of sodium S-4-aminophenylthiosulfate is diazotized as follows. Add 1.4 liters $H_2O$ to 227 gms. sodium S-4-aminophenylthiosulfate, heat to 65° C. to dissolve, and cool to less than 10° C. Gradually add thereto 220 ml. 32% aqueous HCl while maintaining temperature at less than 10° C. While maintaining temperature at less than 10° C., gradually add thereto 20% aqueous $NaNO_2$ until positive to starch-KI paper; about 315 ml. 20% aqueous $NaNO_2$ will be required. Excess nitrous acid is removed from the resulting diazo by adding a few mgs. sulfamic acid until negative to starch-KI paper. Maintain the diazo at 5° C.

Add 1.5 liters $H_2O$ at room temperature to 237 gms. (1 g.m.w.) acetoacet-2′,5′-dimethoxyanilide. Add 80 gms. 50% aqueous NaOH. Add 25% aqueous acetic acid until pH 6.5 results; about 260 gms. 25% aqueous acetic acid will be required. Cool to less than 10° C. and add 300 gms. $NaHCO_3$ solids. Cool to less than 5° C., and then, gradually and during a period of one hour, add thereto the above diazo while maintaining a temperature of less than 5° C. Stir for 3–4 hours to precipitate a portion of the dystuff from the solution; the remaining dyestuff may be salted out of the solution, such as by adding 200 gms. NaCl and stirring 3–4 additional hours while the product warms. Recover the precipitated dye by filtration, and wash the precipitate with 600 ml. 15% aqueous NaCl at room temperature.

The following are examples of making dyeings with the dye of the present invention.

Example 2

A dye composition is prepared by diluting 75 gms. "SODYESUL" Liquid Yellow MCF (C.I. leuco Sulphur Yellow 2, C.I. No. 53120) with 1 liter of water at 30° C. and adding thereto 15 gms. Na₂S and 25 gms.

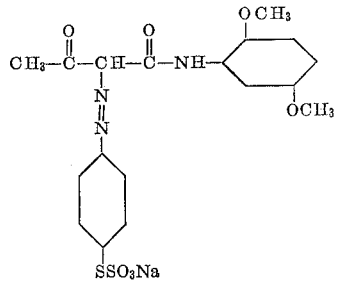

whereupon the azo dye is solubilized to its mercaptide form.

Cotton fabric is padded through the dye composition, squeezed to permit 60% wet pickup based on fabric weight, dried to substantial dryness, steamed in an air-free steamer for 30 seconds at 115° C., passed through an oxidizing bath containing 7.5 gms. sodium dichromate and 7.5 gms. acetic acid per liter of water at 35° C., scoured and dried. A yellow dyeing with good fastness properties results.

Example 3

A reduced dye composition is prepared by dissolving 20 gms.

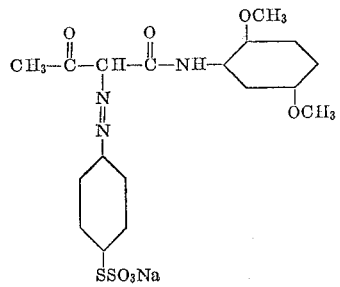

and 20 gms. Na₂S per liter of water at 40° C. Cotton fabric is padded through the dye solution, squeezed to permit 60% wet pickup based on fabric weight, dried to substantial dryness, passed through an oxidizing bath consisting of 7.5 gms. sodium dichromate and 7.5 gms. acetic acid per liter of water at 40° C., whereafter the fabric is scoured and dried. A bright greenish-yellow dyeing with good fastness properties results.

What is claimed is:
1. The dye of the formula

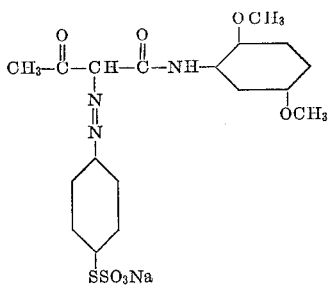

References Cited

UNITED STATES PATENTS

| | | | |
|---|---|---|---|
| 1,086,155 | 2/1914 | Geldermann et al. | 260—193 |
| 1,788,300 | 1/1931 | Huismann et al. | 260—193 |
| 1,947,028 | 2/1934 | Woodward | 260—193 |
| 2,112,764 | 3/1938 | Dahlen et al. | 260—193 X |
| 2,175,370 | 10/1939 | Zwilgmeyer | 260—193 |
| 2,559,181 | 7/1951 | Glahn et al. | 260—193 |
| 2,644,814 | 7/1953 | Fischer | 260—193 |
| 2,729,632 | 1/1956 | Fischer et al. | 260—193 |
| 3,132,134 | 5/1964 | Fischer et al. | 260—193 |

FOREIGN PATENTS

| | | |
|---|---|---|
| 222,259 | 7/1962 | Austria. |

FLOYD D. HIGEL, *Primary Examiner.*